United States Patent [19]

Hulls et al.

[11] 4,189,940
[45] Feb. 26, 1980

[54] ENGINE FAULT DIAGNOSIS

[75] Inventors: Leonard R. Hulls, Marblehead; Stephen C. Hadden, Acton; Lee R. Armstrong, Newton, all of Mass.

[73] Assignee: RCA Corporation, New York, N.Y.

[21] Appl. No.: 910,891

[22] Filed: May 30, 1978

[51] Int. Cl.² .......................................... G01M 15/00
[52] U.S. Cl. .................................................. 73/117.3
[58] Field of Search ...................... 73/115, 116, 117.3

[56] References Cited
U.S. PATENT DOCUMENTS

| | | | |
|---|---|---|---|
| 3,777,559 | 12/1973 | Rennick et al. | 73/117.3 |
| 3,977,239 | 8/1976 | Hulls et al. | 73/115 |
| 3,978,719 | 9/1976 | Hadden et al. | 73/115 |

Primary Examiner—Jerry W. Myrcale
Attorney, Agent, or Firm—Samuel Cohen; Carl V. Olson

[57] ABSTRACT

An engine diagnostic apparatus includes a first transducer positioned in the oil filler neck of the engine for translating the crankcase pressure waveform into a corresponding electrical waveform having a frequency component proportional to engine speed. A second transducer is positioned to translate an exhaust pressure waveform emitted by the engine to a corresponding electrical waveform having a frequency component representative of an engine fault at a frequency proportional to engine speed. The two frequency components are compared to provide diagnostic information.

4 Claims, 3 Drawing Figures

ENGINE FAULT DIAGNOSIS

The present invention relates to automatic testing of internal combustion engines.

Diagnostic apparatus for internal combustion engines has, in the past, necessarily included means for making electrical and mechanical connections to an engine to measure engine speed, ignition timing, compression, etc. Now it has been found possible to measure engine speed, without making any electrical or mechanical connections to the engine, by means including a non-contacting transducer for sensing pressure variations at the end of the engine exhaust pipe due to explosions in individual cylinders of the engine. Such apparatus is described in U.S. Pat. No. 3,978,719 issued on Sept. 7, 1976 to S. C. Hadden, et al., and entitled, "Tachometer Without Physical Connection to Internal Combustion Engine," and U.S. Pat. No. 3,978,416 issued on Aug. 31, 1976, to E. M. Sutphin, Jr. and entitled, "Filter Which Tracks Changing Frequency of Input Signal." Apparatus for determining the evenness or unevenness of power strokes from individual cylinders, without requiring electrical or mechanical connections to the engine, is described in U.S. Pat. No. 3,977,239 issued on Aug. 31, 1976 to L. R. Hulls, et al., and entitled, "Engine Diagnosis From Frequency Components in Exhaust," and in U.S. Pat. No. 4,032,852 issued on June 28, 1977, to L. R. Hulls, et al., and entitled, "Filter Which Tracks Changing Frequency of Input Signal." Apparatus for identifying which one cylinder in an engine is faulty in operation, for the purpose of localizing the part of the engine which requires repair or adjustment, is described in application Ser. No. 854,834, filed on Nov. 25, 1977, by L. R. Hulls and S. C. Hadden and entitled, "Identification of Engine Cylinder Having Fault."

According to an example of the present invention, a transducer is used for translating physical variations in the engine into a corresponding electrical waveform. Reference and fault frequency components in the output of the transducer are separated and compared to provide information identifying certain faults in the engine.

Figure 1:
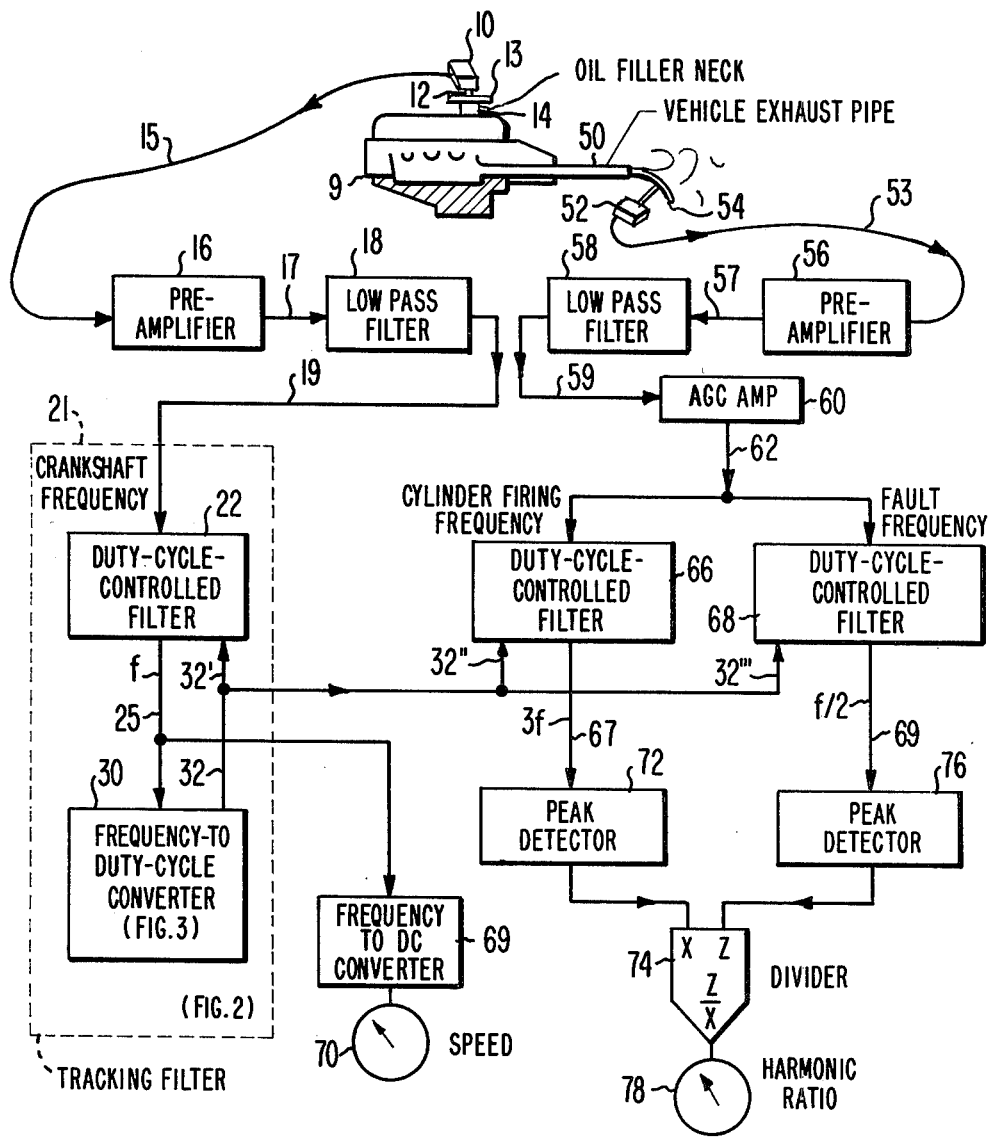
FIG. 1 is a block diagram of a system constructed according to the teachings of the invention for diagnosing engine faults.

Referring now in greater detail to the drawing, FIG. 1 shows an overall diagnostic apparatus for use with an internal combustion engine 9 having an oil filler pipe, or crankcase breather opening 14. A pressure transducer 10, which may be a variable-reluctance pressure transducer Model DP15 manufactured by Validyne Engineering Corporation of Northridge, Calif. 91324, responds to pressures ranging between −1 and +1 pounds per square inch, and is mounted at the end of a metal tube 12 which is 2 inches long and ¼ inch in inside diameter. The other end of the metal tube 12 is threaded into metal disk 13 which is covered on its underside by a soft closed-cell foam. The disk 13 is placed on the oil filler neck 14 of the engine 9 after removal of the usual cover, so that the transducer 10 senses pressure variations in the crankcase of the engine 9 through disk 13 and tube 12.

The pressure transducer 10 is excited with alternating-current excitation from a transducer amplifier 16 over a cable 15. The electrical signal having an amplitude varying with pressure, which is produced by the transducer 10, is applied in the reverse direction shown by the arrowhead over cable 15 to the amplifier 16. The amplifier 16, which may be a Model CD12 transducer indicator manufactured by Validyne Engineering Corporation, together with transducer 10, responds to pressure variations having a frequency range from zero to 1000 Hertz. The prominent fundamental speed-indicating frequency component in the crankcase of an engine may range from 5 Hz at a low engine speed to as high as 200 Hz at a high engine speed. The signal from transducer amplifier 16 in FIG. 1 is applied over line 17 to a low-pass filter amplifier 18, which may include two operational amplifiers constituted by a Motorola Corporation MC1558 integrated circuit unit.

The output of low-pass amplifier 18 is applied over line 19 to the input of a tracking filter 21. The tracking filter includes a duty-cycle-controlled filter 22 having a signal output terminal 25. The output of filter 22 is applied to a frequency-to-duty cycle converter 30, which produces a control signal at 32 having a duty cycle proportional to the crankshaft frequency f, which in turn is proportional to the speed in revolutions per minute of the engine.

Figure 2:
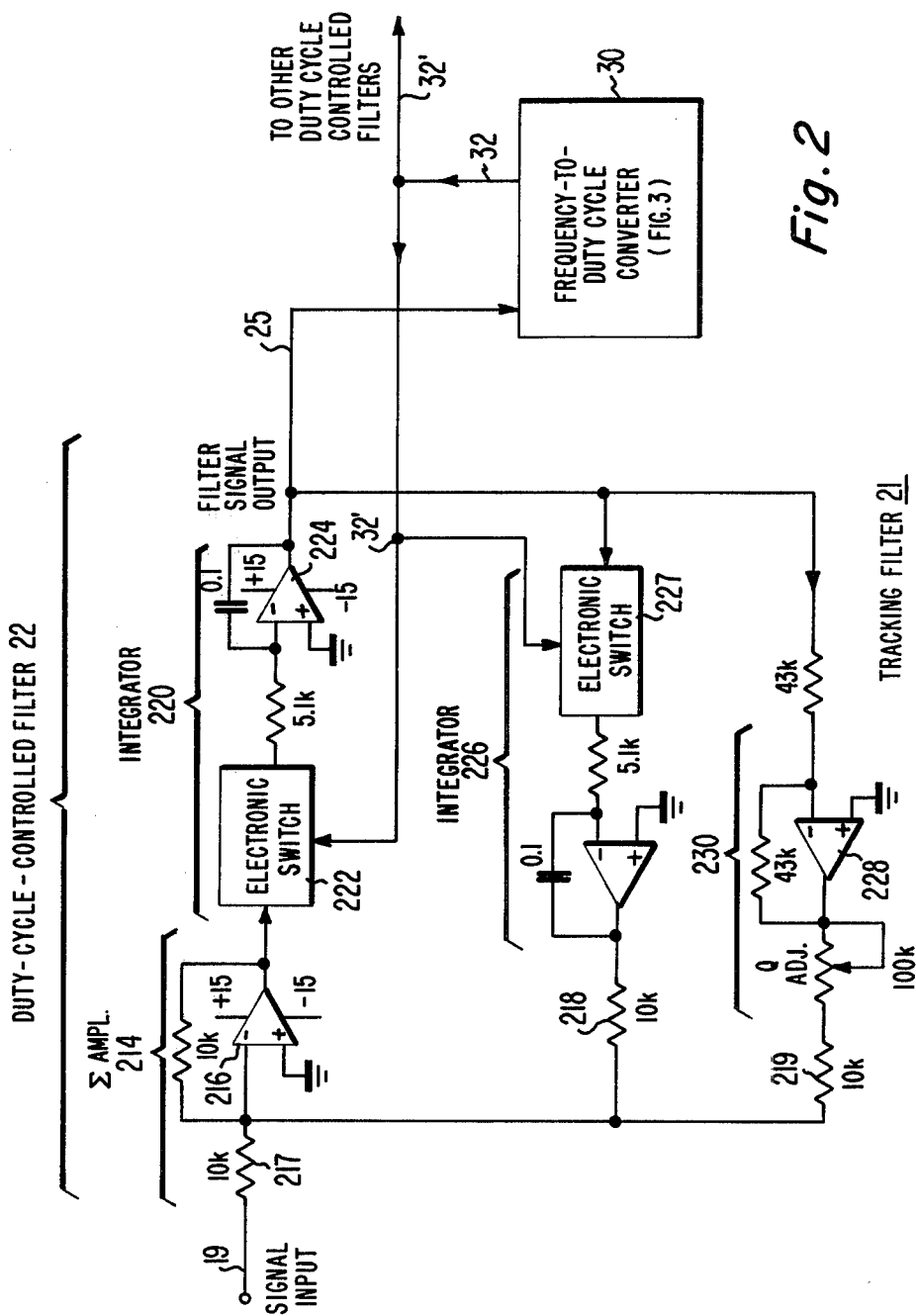
FIG. 2 is a detailed diagram of the tracking filter included in FIG. 1.

The tracking filter 21 in FIG. 1 is shown in FIG. 2 to include a duty-cycle-controlled filter 22 having a signal input terminal 19 and a signal output terminal 25. The input terminal is connected to a summation amplifier 214 consisting of an operational amplifier 216 connected as an inverting gain amplifier having summation input resistors 217, 218 and 219. Inverting gain amplifiers are described at page 172 of "Operational Amplifiers-Design and Applications" edited by Tobey, Graeme and Huelsman and published by McGraw-Hill in 1971. The operational amplifier 216, and other operational amplifiers in FIG. 2 may be constituted by one-fourth of a Texas Instruments TL084 operational amplifier unit.

The output of summation amplifier 214 is connected to an input of an integrator 220 including an electronic switch 222, and an operational amplifier 224 connected as an integrator. The switch 222 may be one-third of a Type CD4053 unit manufactured by RCA Corporation. The output 25 of the integrator is connected in a feedback path consisting of an integrator 226 like integrator 220, and in a parallel feedback path consisting of an operational amplifier 228 connected as an inverting gain amplifier 230.

The duty-cycle-controlled filter 22 in FIG. 2 is similar in construction and purpose to the voltage-controlled filter 200 in U.S. Pat. No. 3,978,719, the difference being that filter 22 includes electronic switches 222 and 227 in integrators 220 and 226, in place of the multipliers used in the prior art filter 200. The electronic switches in filter 22 control the amount of current passed to the operational amplifiers in proportion to the duty-cycle of the rectangular wave control signal applied to the control inputs of switches, whereas the multipliers in the prior art filter 200 control the amount of current passed to the operational amplifiers in proportion to the control voltage applied to the Y inputs of the multipliers. The rectangular wave control signal which determines the frequency band passed by filter 22 is supplied by a frequency-to-duty-cycle converter 30 (to be described in connection with FIG. 3). The converter 30 produces a rectangular wave having a duty cycle proportional to the frequency of the sine wave signal at the output of the filter, and the frequency pass band of the prior art filter 200 is controlled by a frequency-to-voltage converter which produces a control voltage proportional to the frequency of the sine wave signal at the output of the filter. The frequency-to-duty cycle converter 30 is entirely digital in operation, and the converter 30 is capable of reacting with extreme speed and accuracy to changes in the frequency of the signal passed by the filter 22 to cause the pass band of the filter to track the changing frequency of the signal.

Figure 3:
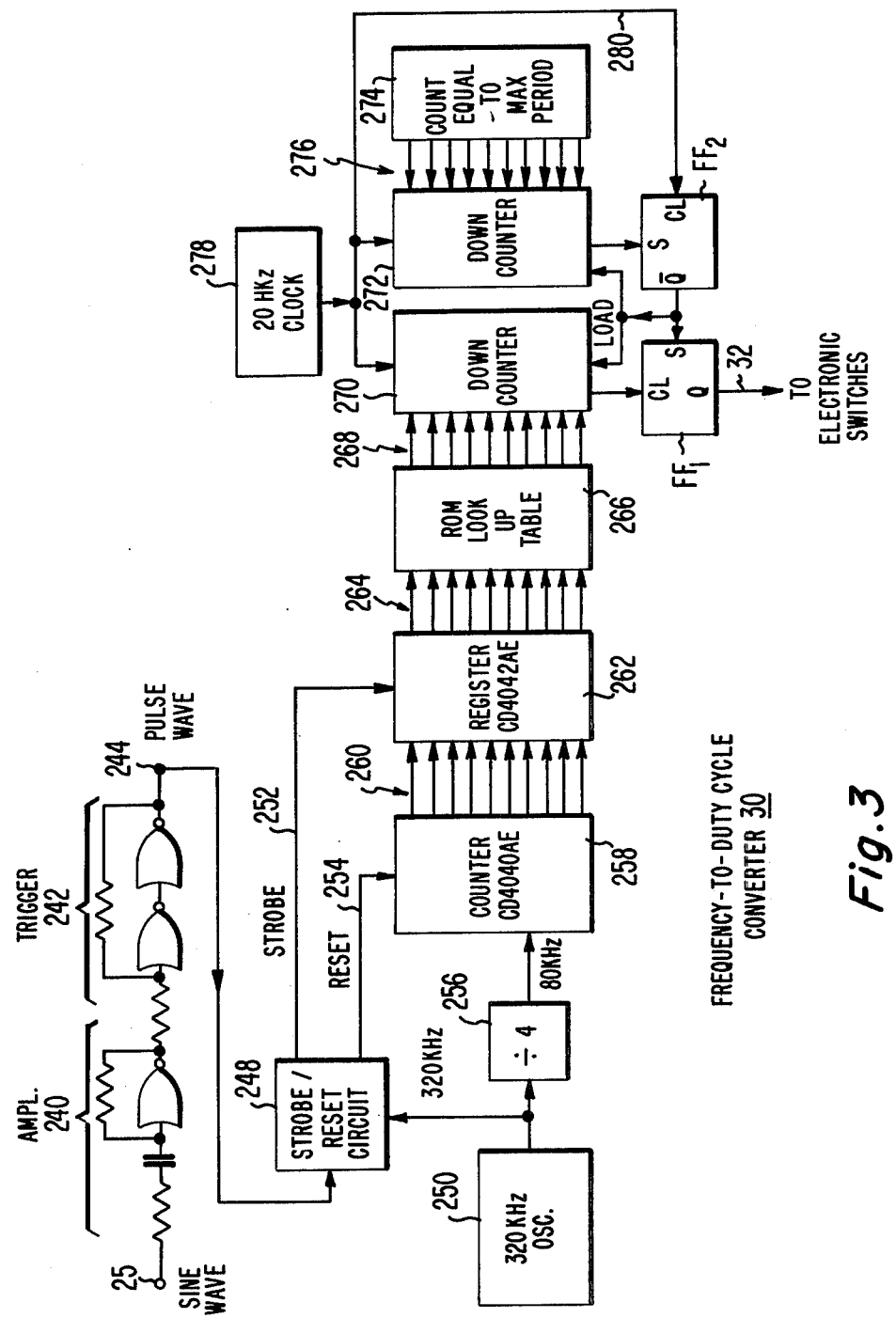
FIG. 3 is a detailed diagram of the frequency-to-duty cycle converter included in FIGS. 1 and 2.

The frequency-to-duty-cycle converter 30 in FIG. 2 is shown in detail in FIG. 3. The input 25 of the converter is connected through a class A amplifier 240 and a trigger circuit with hysteresis, or a limiting amplifier, 242 which produces a pulse wave at 244. The pulse wave is applied to a strobe/reset circuit 248 which also receives a 320 kHz square wave from an oscillator 250. The circuit 248 produces a strobe output pulse at 252, and shortly thereafter a reset output pulse at 254. The strobe and reset pulses occur once per cycle of the input pulse wave, which may have a repetition rate of a few hundred pulses per second. The strobe and reset pulses each have the duration of a half cycle of the square wave from the 320 kHz oscillator. The strobe/reset circuit may have a detailed circuit diagram as shown in FIG. 10 of U.S. Pat. No. 3,978,719.

The frequency-to-duty-cycle converter of FIG. 3 includes a divide-by-four circuit 256 which divides the 320 kHz square wave from oscillator 250 to an 80 kHz pulse wave which is applied to the input of a counter 258. The divider 256 may be constituted by an RCA CD4027AE integrated circuit unit wired in a conventional manner.

The counter 258 counts the 80 kHz input pulses until it is reset by a reset pulse over line 254 from circuit 248. The counter, which may be an RCA CD4040AE integrated circuit unit, has ten output lines 260 over which the count is transferred to a storage register 262 when the register is gated by a strobe pulse over line 252 from the circuit 248. The register 262 may consist of three RCA CD4042AE integrated circuit units. The register 262 has ten output lines 264 connected to the address input of a read-only-memory look-up table 266 which has ten outputs connected to ten inputs of a down counter 270. The 10 bits on the ten lines 264 from the register 262 represent a number between 0 and 1023 proportional to the period of the sine wave passed at 25 by the duty-cycle-controlled filter 22 in FIGS. 1 and 2. The sine wave may have a frequency between 5 and 200 Hz depending on engine speed. The 10 bits are applied as an address to the read-only-memory (ROM) look-up table 266 to access one of the 1024 memory locations in memory and read out the contents thereof over lines 268 to the down counter 270. The word read out from a memory storage location is a number between 0 and 1023 representing the frequency of a sine wave having the period represented by the address of the storage location. Therefore, the outputs, representing frequency, of ROM 266 varies inversely with the input thereto representing period or wavelength. The ROM 266 may be three Type 6353-1 integrated circuit units made by Monolithic Memories, Inc., The down counter 270 receives a count between 25 and 1023 representing a frequency between 5 and 200 Hz of the sine wave from filter 22 in FIGS. 1 and 2. At the same time, under control of a "load" signal, a second similar down counter 272 receives a maximum count of 1023 from a source 274 of ten "1" bits on ten lines 276. Down counters 270 and 272 may each be comprised by three Type 74191 integrated circuits made by Texas Instruments. Both down counters receive pulses from a 20 MHz clock 278, and with each received pulse count down one count from the loaded values toward zero. When the count in down counter 270 reaches zero, it provides an output to the clock input CL of flip-flop $FF_1$, and when the count in down counter 272 reaches zero at a later time, it provides an output to the set input S of the flip-flop $FF_2$. Flip-flops $FF_1$ and $FF_2$ may be a Type 7474 integrated circuits made by Texas Instruments.

When flip-flop $FF_2$ receives a clock pulse over line 280 from clock 278, simultaneously with a set pulse from down counter 272, it produces a $\overline{Q}$ output which loads counts into down counters 270 and 272, and sets flip-flop $FF_1$ via its set input S so that the output Q of $FF_1$ is high. This closes electronic switches 222 and 227 in FIG. 2. Subsequently, when down counter 270 counts down to zero and supplies an output to the clock input CL of flip-flop $FF_1$, $FF_1$ is reset, opening electronic switches 222 and 227 in FIG. 2, and it remains reset until set by flip-flop $FF_2$.

To summarize the operation, a cycle begins when both down counters are loaded and flip-flop $FF_1$ starts providing a positive or high output level at 32. When down counter 270, which counts down from some value between 0 and 1023, reaches zero, the positive output level at output 32 of flip-flop $FF_1$ goes to zero. When down counter 272 counts down from 1023 to zero, which takes 51.2 microseconds, both down counters are reloaded and output 32 of flip-flop $FF_1$ is set high, thus starting a next cycle of operation. During each cycle, the output at 32 is positive for the proportion of 51.2 microseconds that the count loaded into down counter 270 bears to 1024. The duty-cycle of the positive level at 32 varies directly with the frequency of the sine wave passed at 25 by duty-cycle-controlled filter 22.

The output at 32 of the frequency-to-duty-cycle converter of FIG. 3 is connected to the frequency control input terminal 32' of the duty-cycle controlled filter 22 in FIGS. 1 and 2 to make the filter track changes in the frequency component passed by the filter as the frequency changes with changes in engine speed. The output at 32 is also connected to two additional duty-cycle-controlled filters 66 and 68, as will be described. The sine wave at output 25 of filter 22 is connected to a frequency-to-DC converter 69 shown in FIG. 1 which supplies a DC current proportional to the sine wave frequency to a calibrated speed-indicating meter 70. The described components 10, 16, 18, 21, 69 and 70 on the left side of FIG. 1 may be viewed as constituting a tachometer providing a rectangular wave at 32 which has a duty cycle proportional to engine speed for use by filters 66 and 68, and providing a display by meter 70 of engine speed in revolutions per minute.

Returning now to FIG. 1, the internal combustion engine 9 has an exhaust pipe 50. A pressure transducer 52, which may be a variable-reluctance pressure transducer Model DP15 manufactured by Validyne Engineering Corporation of Northridge, Calif. 91324, responds to pressures ranging between −1 and +1 pounds per square inch, and is mounted at the center of a metal tube 54 which is 20 inches long and ½ inch in inside diameter. The tube 54 is curved slightly, to allow the pressure transducer 52 to be located out of the exhaust stream when the tube is inserted about three inches into the open end of the exhaust pipe 50 of the engine 9. The transducer 52 is not in physical contact with the engine 9.

The pressure transducer 52 is excited with alternating-current excitation from a transducer amplifier 56 over a cable 53. The electrical signal having an amplitude varying with pressure, which is produced by the transducer 52, is applied in the reverse direction shown by the arrowhead over cable 53 to the amplifier 56. The amplifier 56, which may be a Model CD12 transducer indicator manufactured by Validyne Engineering Corporation, together with transducer 52, responds to pressure variations having a frequency range from zero to 1000 Hz. The prominent fundamental speed-indicating frequency component in the exhaust of an engine may range from 20 Hz at a low engine speed to as high as 200 Hz at a high engine speed. The signal from transducer amplifier 56 in FIG. 1 is applied over line 57 to a low-pass filter amplifier 58, which may include two operational amplifiers constituted by a Motorola Corporation MC1558 integrated circuit unit.

The output of low-pass filter amplifier 58 is applied over line 59 to the input of an automatic gain control (AGC) circuit 60. The AGC circuit 60 may, for example, be a circuit as described in U.S. Pat. No. 3,995,224 issued on Nov. 30, 1976, to E. M. Sutphin, Jr. and entitled, "Fast Automatic Gain Control Circuit with Adjustable Range."

The output of the AGC amplifier 60 is applied over line 62 to the input of a duty-cycle-controlled filter 66, and to the input of a similar duty-cycle-controlled filter 68. Each of filters 66 and 68 may be the same design as filter 22. Both of filters 66 and 68 are receptive to the control signal over line 32 from the frequency-to-duty-cycle converter 30. When this signal is such that filter 22 in tracking filter 21 is tuned to frequency f, filter 66 is tuned to a frequency nf, which is the cylinder firing frequency, where n is the number of cylinders in a two-stroke engine and is half the number of cylinders in a four stroke engine, and f is the crankshaft rotational frequency. The output of filter 66 is a reference waveform at the cylinder firing frequency, 3f in the present example, which is applied through a peak detector 72 to the X input of a divider or comparator 74. Simultaneously the control signal 32 tunes filter 68 to the frequency f/2 of power strokes in one cylinder of the engine, and its output is a fault waveform which is applied through a peak detector 76 to the Z input of the divider 74. The output of divider 74 is coupled to a harmonic ratio indicator 78.

In the operation of the system of FIG. 1, the engine is operated at an idle or normal operating speed, the pressure transducer 10 is placed in the breather or oil-filler opening of the engine 9 to produce an electrical tachometer signal having a frequency component at the crankshaft frequency f, and the transducer 52 is positioned in the exhaust pipe of the engine 9 to produce an electrical signal which has a reference frequency component and which may have frequency components of various amplitudes representative of various faults or malfunctions in the engine.

The pressure pulsations impinging on the transducer 10 produce a corresponding electrical wave which is amplified in transducer amplifier 16 and low-pass amplifier 18. The amplified wave at 19 is applied to the input of the duty-cycle-controlled filter 22 in the tracking filter 21. The filter has a narrow frequency pass band which passes a prominent crankshaft frequency component f that varies directly with engine speed, and which rejects or attenuates other disturbing frequency components. The output at 25 is, therefore, a relatively clean sine wave which is translated to a relatively high frequency rectangular wave in the frequency-to-duty-cycle converter 30. The rectangular wave, which has a duty cycle proportional to the frequency of the sine wave output of filter 22, is fed back over line 32 to the frequency control input 32' of the filter 22 to make the filter lock onto the sensed crankshaft frequency component and to track changes in its frequency which are due to changes in engine speed.

The transducer 10, preamp 16, low-pass filter 18 and tracking filter 21 constitute a tachometer having an electrical engine-speed-indicating output at 32 in the form of a rectangular wave having a duty cycle proportional to engine speed. The rectangular wave is used to control duty-cycle-controlled filters 66 and 68, as will be described, and it can if desired be converted to a displayed indication of engine RPM. FIG. 1 shows an alternative arrangement in which engine RPM is indicated by converting the frequency at the output 25 of filter 22 to a voltage which operates an RPM meter 70.

Transducer 52, low-pass filter 58, preamp 56 and AGC amplifier 60 produce an electrical signal corresponding with pressure variations in the exhaust pipe of the engine, and having a reference frequency component, and fault frequency components, all of which change in frequency in proportion with changes in engine speed. Duty-cycle-controlled filter 66 is constructed or adjusted to pass a reference frequency component, which may be a component having the cylinder firing frequency 3f, under control of the rectangular wave on line 32 from converter 30. The frequency pass band of the filter 66 is continuously controlled by the rectangular wave to pass and track the reference frequency component through frequency changes due to changes in engine speed.

The duty-cycle-controlled filter 68 operates in a similar manner, under control of the rectangular wave on line 32 to track a fault frequency component, which may be a frequency of f/2, equal to half the crankshaft frequency f, and equal to the frequency of power strokes in one cylinder of the engine.

The reference or cylinder firing frequency component 3f from filter 66 is applied to peak detector 72 having its output connected to the X input of divider 74; and the fault frequency component f/2 from filter 68 is applied to peak detector 76 having its output connected to the Z input of divider 74. The output of divider 74 is the ratio of the amplitude of the fault frequency component to the amplitude of the reference frequency component, and this ratio is displayed by the ratio meter 78. If the ratio of the amplitude of the fault frequency f/2 to the amplitude of the reference frequency 3f is above a predetermined threshold value, it is known that there is a fault impairing the operation of one cylinder of the engine. If the ratio of amplitudes follows one of a number of known patterns as the speed of the engine is varied, the particular fault causing that pattern can be diagnosed from the pattern observed.

The use of the invention for diagnosing faults in a four-stroke cycle six cylinder diesel engine operative over a range of crankshaft speeds may involve frequency components over corresponding frequency ranges as follows:

| | | | | | |
|---|---|---|---|---|---|
| Crankshaft speed range | 600 | rpm | to | 3000 | rpm |
| Crankshaft frequency f from filter 22 | 10 | Hz | to | 50 | Hz |
| Cylinders firing reference frequency 3f from filter 66 | 30 | Hz | to | 150 | Hz |
| One cylinder fault frequency f/2 from filter 68 | 5 | Hz | to | 25 | Hz |

The ratios of fault frequency amplitude to reference frequency amplitude for an engine which is fault free and the engine when suffering specified faults, over the operating speed range of the engine, may be as follows:

| Condition | Ratio at idle | Ratio at mid speed, no load | Ratio at full speed, no load |
|---|---|---|---|
| Fault free | 0.02 | 0.1 | 0.04 |
| Leaking exhaust valve | 2.0 | 1.0 | .6 |
| Fuel injector which fails to inject fuel | 0.8 | 1.2 | 2.0 |

The described system includes a tachometer transducer in the form of a pressure transducer 10 positioned in the engine oil filler neck to generate a crankshaft frequency component and to derive therefrom an engine speed tracking signal for controlling filters 66 and 68. Alternatively, transducer 10 may be positioned in the air intake opening of the engine, Or, the tachometer transducer may be a unit responsive to sound or vibration or the mechanical position of a moving part of the engine.

The described system includes a reference and fault transducer 52 positioned in the engine exhaust pipe to generate a reference frequency component at the firing frequency of all cylinders and a fault frequency component at the firing frequency of one cylinder. Alternatively, the reference frequency component may be derived from the tachometer transducer 10. Alternatively, the reference frequency component may be at the crankshaft rotational frequency of the engine. Alternatively, the fault frequency component may be at any integral multiple of the firing frequency of one cylinder, depending on what faults it is desired to detect.

In summary, engine speed information is obtained by a transducer positioned to respond to fluctuations which are independent of unequal performance in cylinders of the engine, and engine fault information is obtained by a transducer positioned to respond to fluctuations which result from unequal performance in cylinders of the engine.

What is claimed is:

1. An engine diagnostic apparatus, comprising
a tachometer for generating an electrical signal varying in proportion with engine speed, said tachometer including a transducer for translating a cyclic variation within the engine to a corresponding electrical signal having a frequency component which varies in frequency in direct proportion with engine speed,
a second transducer for translating a pressure waveform at the exhaust opening of said engine into a corresponding electrical waveform having frequency components which vary in frequency in proportion with engine speed,
a first controllable filter which passes and tracks a cylinder firing frequency component in the output of one of said transducers under control of the electrical signal from said tachometer, and
a second controllable filter which passes and tracks a fault frequency component in the output of said second transducer under control of the electrical signal from said tachometer, and
means to compare the outputs of said first and second controllable filters.

2. An apparatus according to claim 1 wherein said means to compare the outputs of said first and second controllable filters includes respective first and second peak detectors, and a divider responsive to the outputs of the peak detectors, and means to display the output of said divider.

3. An apparatus according to claim 1 wherein said tachometer transducer is disposed to translate the pressure waveform within the crankcase of the engine.

4. An engine diagnostic apparatus, comprising
a first transducer for translating a pressure waveform at the oil filler opening of the engine to a corresponding electrical signal having a frequency component which varies in frequency in direct proportion with engine speed,
a tracking filter which passes said frequency component, and tracks changes in said frequency component due to changes in engine speed, said tracking filter including a first controllable filter and a frequency-to-control-signal converter which responds to the output of the controllable filter and generates a control signal which controls the controllable filter to track changes in the frequency of said frequency component,
a second transducer for translating a pressure waveform at the exhaust opening of the engine to a corresponding electrical signal having frequency components which vary in frequency in direct proportion with engine speed,
a second controllable filter which passes and tracks a cylinder firing frequency component in the output of said second transducer under control of the control signal from said frequency-to-control-signal converter,
a third controllable filter which passes and tracks a fault frequency component in the output of said second transducer under control of the control signal from said frequency-to-control-signal converter, and
means to determine the ratio of the amplitudes of the frequency components passed by said second and third controllable filters, whereby to diagnose certain faults in said engine.

* * * * *